US011143566B2

(12) United States Patent
Huang et al.

(10) Patent No.: US 11,143,566 B2
(45) Date of Patent: Oct. 12, 2021

(54) INDUSTRIAL ROBOT FOR FOOD INDUSTRY COMPRISING A LEAKAGE DETECTION DEVICE

(71) Applicant: ABB Schweiz AG, Baden (CH)

(72) Inventors: Jiangwei Huang, Västerås (SE); Shanghua Li, Västerås (SE)

(73) Assignee: ABB Schweiz AG, Baden (CH)

( * ) Notice: Subject to any disclaimer, the term of this patent is extended or adjusted under 35 U.S.C. 154(b) by 327 days.

(21) Appl. No.: 16/340,030

(22) PCT Filed: Nov. 7, 2016

(86) PCT No.: PCT/EP2016/076797
§ 371 (c)(1),
(2) Date: Apr. 5, 2019

(87) PCT Pub. No.: WO2018/082785
PCT Pub. Date: May 11, 2018

(65) Prior Publication Data
US 2020/0033221 A1 Jan. 30, 2020

(51) Int. Cl.
*G01M 3/04* (2006.01)
*G01M 3/38* (2006.01)
*B25J 9/16* (2006.01)

(52) U.S. Cl.
CPC ............... *G01M 3/04* (2013.01); *G01M 3/38* (2013.01); *B25J 9/1674* (2013.01)

(58) Field of Classification Search
CPC ............ G01M 3/04; G01M 3/38; G01M 3/20; G01M 3/025; B25J 9/1674
See application file for complete search history.

(56) References Cited

U.S. PATENT DOCUMENTS

| 2008/0258402 A1* | 10/2008 | Tamura | B25J 19/0075 |
| | | | 277/345 |
| 2009/0131617 A1 | 5/2009 | Thorn et al. | |
| 2010/0248382 A1* | 9/2010 | Lin | H01L 21/6719 |
| | | | 436/164 |

(Continued)

FOREIGN PATENT DOCUMENTS

| DE | 10061111 | 7/2002 |
| DE | 102012014486 A1 | 9/2013 |

(Continued)

OTHER PUBLICATIONS

English Machine Translation of Dittes et al., DE 10 2012 014486 A1, Sep. 12, 2013, translated online Apr. 2021 (Year: 2013).*

(Continued)

*Primary Examiner* — David Z Huang
(74) *Attorney, Agent, or Firm* — Whitmyer IP Group LLC

(57) ABSTRACT

An industrial robot for food industry having a leakage detection device for detecting a liquid leaking into the robot, and the leakage detection device includes at least one indicator strip arranged inside the robot and configured to change color in contact with a liquid, a sensor module configured to detect changes in color of the at least one indicator strip, and a detector unit configured to determine presence of liquid inside the robot based on the detected color changes of the indicator strip, and the leakage detection device in is capable of distinguishing between lubricant and water.

14 Claims, 3 Drawing Sheets

(56) References Cited

U.S. PATENT DOCUMENTS

2014/0158300 A1\* 6/2014 Hayata .................. C09J 133/08
156/345.3

FOREIGN PATENT DOCUMENTS

| EP | 1621863 | A2 | 2/2006 |
| EP | 2919027 | A1 | 9/2015 |
| EP | 2999567 | A2 | 3/2016 |
| KR | 101555681 | B1 | 10/2015 |
| WO | 2010022991 | A1 | 3/2010 |
| WO | 2014075769 | A2 | 5/2014 |

OTHER PUBLICATIONS

International Search Report & Written Opinion of the International Searching Authority Application No. PCT/EP2016/076797 Completed: Jul. 3, 2017; dated Jul. 12, 2017 13 Pages.

\* cited by examiner

INDUSTRIAL ROBOT FOR FOOD INDUSTRY COMPRISING A LEAKAGE DETECTION DEVICE

TECHNICAL FIELD

The present invention relates to an industrial robot suitable for food industry.

BACKGROUND

Equipment used in the food processing and particularly in the protein industry, e.g., for handling meat, poultry, fish, seafood and dairy, is subject to strict hygiene requirements and must be washed down daily using hot high-pressure water and chemical agents, such as detergent and disinfectant. The use of chemical agents is totally dependent on the customers. Some of them use acid and some of them use alkaline or chlorine, all of which are highly corrosive towards metals. The wash down environment is extremely corrosive for any processing equipment including robots. For this reason, food-handling equipment is often preferably made from stainless steel having a smooth or polished exterior surface without additional coatings or paintings.

An industrial robot comprises a plurality of joints and a transmission system including motors, gear units, and rotatable shafts for moving the joints. It is difficult to make the robot joints completely tight from outside, especially under high-pressure water spraying in the wash down process, since the joints need to rotate. The temperature cycle during cooling of the robot will also create temporary vacuum which tends to suck in water with detergent and disinfectant. There are hardly any rotary seals that can manage such harsh environments with a hygienic design from outside. Therefore, the robot or other processing equipment in the wash down environment always suffers from severe corrosion both from outside and inside. When the water including the chemical agents gets inside the robot, it will accelerate the corrosion and bring bacteria inside, which cannot be easily detected.

Besides of leakage from outside, leakage of gear units is an issue occurring in robots and any other conventional machines. These leakages will allow lubricants to come out to contaminate the food, which can hardly be avoided based on today's sealing technology. When the leakages are discovered from the outside by naked eyes, severe damage has already been made either to the food or to the robots.

DE102012014486 (A1) discloses a sensor arrangement for detecting leakage of a liquid e.g. oil or water from an installation component e.g., an electromotor. An indicator paper is arranged on a radially outer side of a receiving ring. The indicator paper changes its color in contact with the liquid. For example, the color of the indicator paper changes from light blue to dark blue. An optical fiber passes backscattered light from the indicator paper to a sensor, such as a color sensor or an intensity sensor, which is used to measure the backscattered light through the optical fiber.

SUMMARY

It is an object of the present invention to at least partly overcome the above problems, and to provide an improved robot for the food industry.

This object is achieved by an industrial robot according to the invention.

The robot comprises a leakage detection device for detecting a liquid leaking into the robot, the leakage detection device comprising at least one indicator strip arranged inside the robot and configured to change color in contact with a liquid, a sensor module configured to detect changes in color of the indicator strip, and a detector unit configured to determine presence of liquid inside the robot based on the detected color changes of the at least one indicator strip. The leakage detection device is capable of distinguishing between lubricant and water.

The detector unit is configured to distinguish between lubricant and water based on the detected color changes of the at least one indicator strip. The at least one indicator strip can be one wide indicator strip, two or more narrower indicator strips arranged close to each other, or two or more spaced apart indicator strips. The indicator strip is, for example, a pH-strip configured to change color in dependence on the pH value of a liquid in contact with it, or an indicator paper configured to change color when it is wet. The lubricant is, for example, oil or grease.

The invention makes it possible to detect leakage of water from the outside of the robot as well as leakage of lubricant, usually oil, from the inside the robot, and to distinguishing whether the leakage is lubricant or water. The leakage detection device according to the invention enables early detection of water leaking into the robot, and by that prevents damages to the robot and prolongs the lifetime of the robot. The leakage detection device according to the invention also enables early detection of the leakage of lubricant inside the robot and makes it possible to take measures before it does any damage to the food or to the robot.

Further, the leakage detection device is simple, cost-effective, and easy to install in the robot.

The invention enables that the leakage status of the robot at certain critical points can be checked all the time, and if a leakage is detected a signal can be sent to a central control unit, which could call for immediate maintenance and service actions.

According to an embodiment of the invention, the indicator strip is a pH-strip configured to change color in dependence on the pH value of a liquid in contact with it. Using a pH-strip instead of an indicator paper makes it possible to distinguish between corrosive water and neutral water. For example, when the pH-strip is in contact with pure water the pH-strip is green. The pH-strip changes its color to red when it is in contact with acid water, i.e., water with a pH level lower than 7, and depending on the pH-level different shades of red are achieved, and the pH-strip changes its color to blue when it is in contact with basic water, i.e., water with a pH-level higher than 7, and depending on the PH-level different shades of blue are achieved. Thus, it is possible to distinguish between corrosive water and pure water.

Further, it is possible to distinguish between lubricant and corrosive water based on the detected color change of a single pH-strip. The lubricant normally has a neutral PH, and thus the color of the pH-strip will not change to a different color, but will change to a darker color. For example, the pH-strip is green in air, and the color of the pH-strip will change to dark green after it has absorbed the oil. As described above, corrosive water will change the color of the pH-strip to another color, such as blue or red.

Using a pH-strip, also makes it possible to detect a certain type of chemical agent in the water based on the detected color of the pH-strip, since different chemical agents have different pH.

According to an embodiment of the invention, the detector unit is configured to determine presence of water containing chemical agents, i.e., corrosive water, inside the robot based on the detected color change of the pH-strip. This embodiment enables detection of water containing chemical agents leaking into the robot. This embodiment of the invention is based on the realization that corrosive water from the food industry is either acid or basic, and it is possible to detect acid as well as basic water using a pH-strip arranged inside the robot. Pure water is neither acid nor basic. For example, if chlorine is dissolved in water, hypochlorous acid and hydrochloric acid are formed. Thus, it is possible to detect the intrusion of corrosive water based on the change of color of the pH-strip. Pure water will cause only minor change in the color of the pH-strip, and further the color is different from the colors of the pH-strip caused by the corrosive water. In order to detect the intrusion of corrosive water, the color of the pH-strip is detected. The leakage detection device according to this embodiment makes it possible to distinguish between corrosive water and pure water, such as moisture, which is causes less harm to the robot.

According to an embodiment of the invention, the leakage detection device is configured to distinguish whether the detected water is basic or acid based on the detected color of the pH-strip. It can be of interest to know whether the detected water is basic or acid, for example, in order to take the correct measure to stop the leakage and to prevent corrosion of the robot.

According to an embodiment of the invention, the leakage detection device is configured to detect lubricant, such as lubricating oil, leaking from the transmission system as well as water leaking from the outside of the robot, and to distinguish whether the leakage is from the transmission system or from the outside of the robot based on the detected color change of the at least one indicator-strip. This embodiment makes it possible to detect intrusion of water as well as leakage of lubricant from the transmission system of the robot, and to tell whether the leakage is lubricant or water. This embodiment makes it possible to detect the leakage of lubricant from the transmission system much earlier and before it does any damage to the food or to the robot.

According to an embodiment of the invention, the sensor module comprises at least one sensor facing the indicator strip. By arranging the sensor facing the indicator strip, means for transmitting the light from the indicator strip to the sensor, such as optical fibers, are not needed. This makes the leakage detection device less complicated compared to the prior art.

According to an embodiment of the invention, the transmission system comprises a rotatable shaft for moving one of the joints, and the indicator strip is arranged on the rotatable shaft. The indicator strip can easily be attached to the shaft. The rotatable shaft is connected to the robot joint, and thus water penetrating through the robot joint will come into contact with the indicator strip soon after it has entered the inside of the robot. Further, the rotatable shaft is connected to the gear unit and motor of the transmission system.

According to an embodiment of the invention, the transmission system comprises a gear unit, and said indicator strip is arranged in a space between the gear unit and one of the joints. Suitably, the indicator strip is arranged on the rotatable shaft between the gear unit and one of the joints. By arranging the indicator strip between the gear unit and the joint, it is possible to detect lubricant leaking from the transmission system as well as water ingression through the joint.

According to an embodiment of the invention, the at least one indicator strip is located closer to the gear unit than to the joint, since lubricant travels more slowly than water. The leakage of lubricant from the transmission system is usually derived from the gear unit. The lubricant is more viscous than water and, accordingly, moves slower than water. By arranging the indicator strip closer to the gear unit, a fast detection of leaking lubricant is achieved. Thus, it is possible to quickly take measures to prevent the lubricant from leaking out from the robot, for example, to stop the robot, and by that avoid contamination of the food. Further, arranging the at least one indicator strip closer to the gear unit than to the joint, makes it possible to distinguish between lubricant and pure water, such as moisture. Due to the high viscosity of the lubricant, the indicator strip or part of the strip disposed closest to the gear unit will change color before the strip or part of the strip disposed further away from the gear unit will change color. Another advantage with arranging the indicator strip or strips closer to the gear unit than to the joint, is that it is possible to detect leakage of water as well as lubricant using the same indicator strip/strips.

According to an embodiment of the invention, the sensor module is configured to detect changes in color of different parts of said at least one indicator strip, and said detector unit is configured to determine whether the leakage comes from the transmission system or from the outside of the robot based on the detected changes in color in different parts of the at least one indicator strip. By detecting color changes in different parts of the indicator strip, it is possible to determine whether the leakage comes from the transmission system or from the outside of the robot, and by that determine whether the leakage is lubricant or water. In this embodiment it is possible to use a simple indicator strip, which turns darker in contact with a liquid, instead of a pH paper.

According to an embodiment of the invention, the sensor module comprises a first sensor and a second sensor configured to detect changes in color in different parts of the at least one indicator strip, and the detector unit is configured to determine whether the leakage comes from the transmission system or from the outside of the robot based on the output from the first and second sensors. In this embodiment, the at least one indicator strip can be one wide indicator strip, or two or more narrower indicator strips arranged close to each other. By comparing the output from the first and the second sensor, it is possible to determine whether the leakage comes from the transmission system or from the outside of the robot and, accordingly, to distinguish between leakage of lubricant and corrosive water. By using two sensors in this way, it is possible to use cheap sensors, such as photo reflectors.

According to an embodiment of the invention, the transmission system comprises a seal enclosing the shaft for preventing leakage of lubricant, one of the sensors is arranged to detect changes in color of the at least one indicator strip in an area at a distance from the seal, and the other sensor is arranged to detect changes in color of the at least one indicator strip in an area close to the seal. The at least one indicator strip can be one wide indicator strip, or two or more narrower indicator strips arranged close to each other. The at least one indicator strip is disposed closer to the gear unit than to the joint. One of the sensors is configured to detect color changes of an indicator strip or part of the indicator strip disposed closest to the gear unit, and the other sensor is configured to detect color changes of the indicator strip or part of the strip disposed further away from the gear unit. Due to the high viscosity of the lubricant, the indicator strip or part of the strip disposed closest to the gear unit will change color before the indicator strip or part of the strip disposed further away from the gear unit will change color. Thus, by detecting color changes of parts of the indicator strip located at different distances from the seal it is possible to determine whether the color change depends on leakage of lubricant or water from the outside of the robot.

According to an embodiment of the invention, the leakage detection device comprises a first and a second indicator strip arranged inside the robot, the first indicator strip is located closer to the joint and the second indicator strip is located closer to the seal, and one sensor is arranged to detect changes in color of the first indicator strip and another sensor is arranged to detect changes in color of the second indicator strip. Since the first indicator strip is located closer to the joint, one sensor can detect color changes due to a leakage from the outside of the robot, and since the second indicator strip is located closer to the seal, the other can detect color changes due to leakage from the transmission system. This embodiment makes it easy to determine whether the leakage is from the transmission system or from the joint.

According to an embodiment of the invention, the sensor module is configured to generate a voltage signal based on the color of the indicator strip and the detector unit is configured to receive the voltage signal from the sensor module and to detect the color change of the indicator strip based on the on the received voltage signal, such as the level of the voltage signal. Suitably, the detector unit is configured to detect the color change of the indicator strip based on the level of the voltage signal and at least one threshold value for the voltage. This embodiment provides a simple detection of a color change in the indicator strip.

According to an embodiment of the invention, the detector unit is configured to detect the presence of liquid inside the robot based on the level of the voltage signal and at least one threshold value for the voltage.

According to an embodiment of the invention, the sensor module comprises at least two indicator papers configured to change color in contact with a liquid, the at least two indicator papers being arranged at different locations, the sensor module comprising at least two sensors, each sensor being configured to detect changes in color of the respective indicator paper at the respective location, and the detector unit is configured to distinguish between lubricant and water based on the location of a sensor detecting a color change of the respective indicator paper.

According to an embodiment of the invention, the detector unit is configured to detect the presence of water containing chemical agents inside the robot based on the level of the voltage signal and at least one threshold value for the voltage. The at least one threshold value for the voltage can also be an interval for the voltage. The threshold value, or voltage interval depends on the type of chemical agent in the water to be detected. Thus, the threshold value, or voltage interval needs to be adjusted for different applications. For example, a first threshold value or voltage interval is used for detecting water with low pH, and a second threshold value or voltage interval is used for detecting water with high pH. This embodiment provides a simple detection of a water containing chemical agents inside the robot.

According to an embodiment of the invention, the detector unit is configured to detect lubricant leaking from the transmission system based on the level of the voltage signal and at least one threshold value for the voltage. This threshold value, or interval is different from the threshold value(s) used for detecting water containing chemical agents. This embodiment provides a simple detection of lubricant leaking from the transmission system.

According to an embodiment of the invention, the detector unit is configured to distinguish whether the leakage is from the transmission system or from the outside of the robot based on the level of the voltage signal, a plurality of threshold values or intervals for the voltage.

According to an embodiment of the invention, the at least one sensor is an IR-based sensor, such as photo reflector, which provides different voltage output based on different reflecting ratios of the surface of the indicator strip, and accordingly based on the color of the strip. Using an IR-based sensor is a cost-effective way to detect changes in the color of the strip, and thus reduces the costs for the leakage detection device.

According to an embodiment of the invention, said sensor module comprises an at least one photo reflective sensor that provides different voltage output based on different reflecting ratio of the indicator strip.

According to an embodiment of the invention, the sensor is a CCD camera and the detector unit comprises an image recognition module, configured to detect changes in color of the indicator strip.

BRIEF DESCRIPTION OF THE DRAWINGS

The invention will now be explained more closely by the description of different embodiments of the invention and with reference to the appended figures.

DETAILED DESCRIPTION

Figure 1:
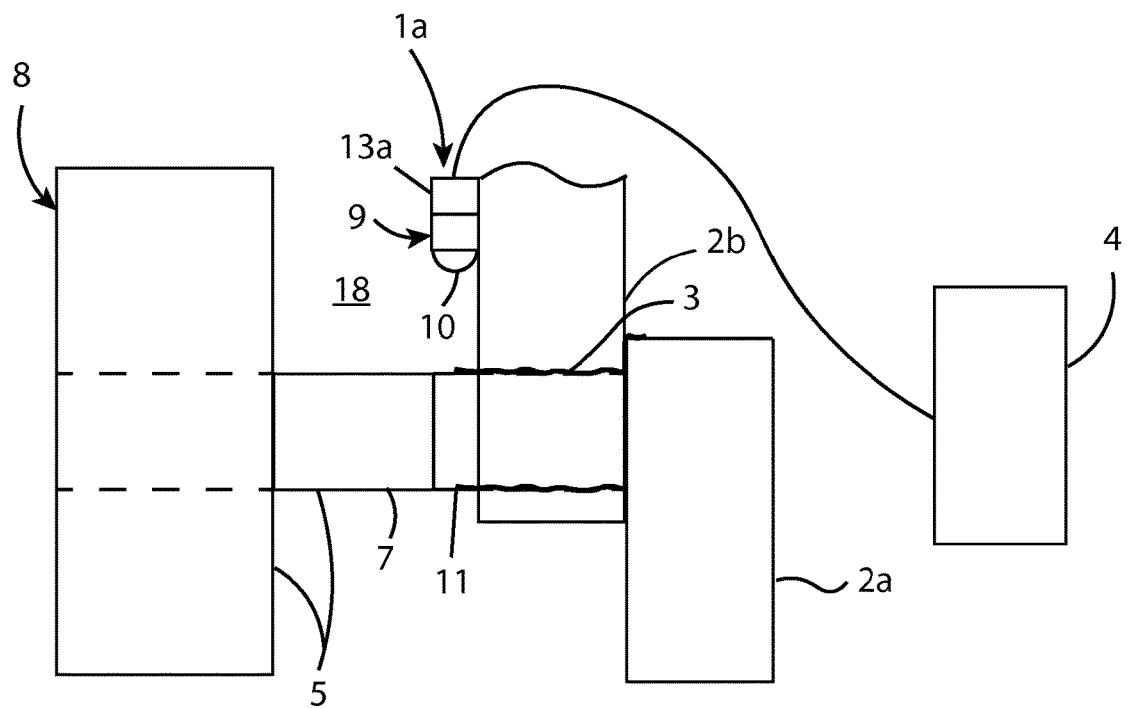
FIG. 1 shows a part of a robot according to a first embodiment of the invention including a leakage detection device.

FIG. 1 shows a part of an industrial robot including a leakage detecting device 1a according to a first embodiment of the invention. An industrial robot comprises a plurality of arms 2a-b movable in relation to each other about a plurality of robot joints 3, and a robot controller 4 adapted to control the motions of the robot arms. Each of the robot joints 3 is driven by a transmission system 5. Each transmission system comprises a motor (not shown), a gear unit 8 and a rotatable shaft 7 connected between the gear unit and the respective arm. In the example shown in FIG. 1, a first arm 2a is fixedly connected to the shaft 7. The shaft 7 extends through a second arm 2b. Accordingly, the first arm 2a and the shaft 7 are rotatable in relation to the second arm 2b to which the gear unit 8 is fixedly attached. A joint 3 is formed between the first and second arms 2a-b, and between the shaft 7 and the second arm 2b. As illustrated in FIG. 1, water leaking from outside the robot will follow the joint 3 and end up in a space 18 between the gear unit 8 and the second arm 2b, and accordingly between the gear unit and the joint 3.

The leakage detection device 1a is adapted to detect water containing a chemical agent, which changes the pH level of the water, inside the robot. The chemical agent is, for example, a detergent or a disinfectant. The leakage detection device 1a is adapted to detect if acid and/or basic water is leaking into the robot. The water is originating from the outside environment and is leaking to the inside of the robot through the robot joint 3 of the robot. The leakage detection device 1a is adapted to detect water that has entered the robot through the robot joint 3 in the space 18 between the gear unit 8 and the second arm 2b. The leakage detection device 1a comprises a sensor module 9 and at least one indicator strip. In this embodiment the indicator strip is a pH-strip 11. The pH-strip 11 changes its color in dependence on the pH of the liquid in contact with the pH-strip. Suitably, the pH-strip is made of pH paper. A suitable pH indicator is Thymol Blue, which shows clear color changes. The pH-strip 11 is arranged inside the robot, for example, on the shaft 7. In the embodiment shown in FIG. 1, the pH-strip 11 is arranged on the shaft 7 between the gear unit 8 and the robot joint 3, but closer to the robot joint. The pH-strip 11 changes its color when it is in contact with acid or basic water coming in from the robot joint 3. The color of the pH-strip depends on the pH of the water. For example, the pH-strip will turn red when the water is acid and turn blue when the water is basic. Other colors can also be realized depending on which type of pH paper and pH indicator is used.

The sensor module 9 is adapted to detect the changes in color of the pH-strip 11. The sensor module 9 comprises at least one sensor 10. However, the sensor module may comprise two or more sensors. The sensor 10 is arranged above the pH-strip 11 and so that the sensor is facing the pH-strip. The sensor 10 can, for example, be an IR-based sensor also called a photo reflector, or a CCD camera. The leakage detection device 1a further comprises a detector unit 13a connected to the sensor module 9. The detector unit 13a is configured to detect the presence of water containing chemical agents leaking into the robot based on the output from the sensor 10. The detector unit 13a is configured to receive the output from the sensor module, to detect color changes of the pH-strip 11 based on the received output, and to determine the presence of water containing chemical agents inside the robot based on detected color changes of the pH-strip. In the embodiment shown in FIG. 1, the pH-strip 11 is arranged on the rotatable shaft 7 between the gear unit 8 and the second arm 2b, but closer to the second arm 2b than to the gear unit.

In one embodiment, the sensor 10 is an IR-based sensor called a photo reflector. The photo reflector includes a LED which produces light with a wavelength in the Infra-Red (IR) spectrum, and an IR sensor that detects light at the same wavelength. The IR sensor is arranged above the pH-strip 11, and the produced light is directed towards the pH-strip. The IR sensor is configured to detect the light reflected in the pH-strip. The output signal from the IR sensor depends on the value of the reflected light and, accordingly, on the brightness of the color of the pH-strip. When the pH-strip is in contact with water having a high or low pH, the color of the pH-strip changes and so does the brightness of the pH-strip, which changes the output signal from the IR sensor.

The detector unit 13a detects the changes in the output signal from the sensor and based thereon detects the presence of acid or basic water in the robot. If such changes in the output signal from the sensor are detected, the detector unit 13a may send a signal containing information about the change to the robot controller 4. The detector unit can also be configured to determine whether the water is acid or basic based on the output signal from the sensor. It is also possible to determine the acidity of the water. If the sensor 10 is a photo reflector, the color change of the pH-strip 11 will be interpreted into a voltage signal. The value of the voltage signal depends on the color of the pH-strip. To determine whether the leakage is from water containing chemical agents, the detector unit 13a is configured to compare the output voltage from the photo reflector with one or more predetermined threshold values. The detector unit 13a can also be configured to determine whether the detected water is acid or basic based on the output voltage from the photo reflector and predetermined threshold values. The threshold value(s) can be selected so the detector unit only responds to a certain range of color changes.

Figure 2:
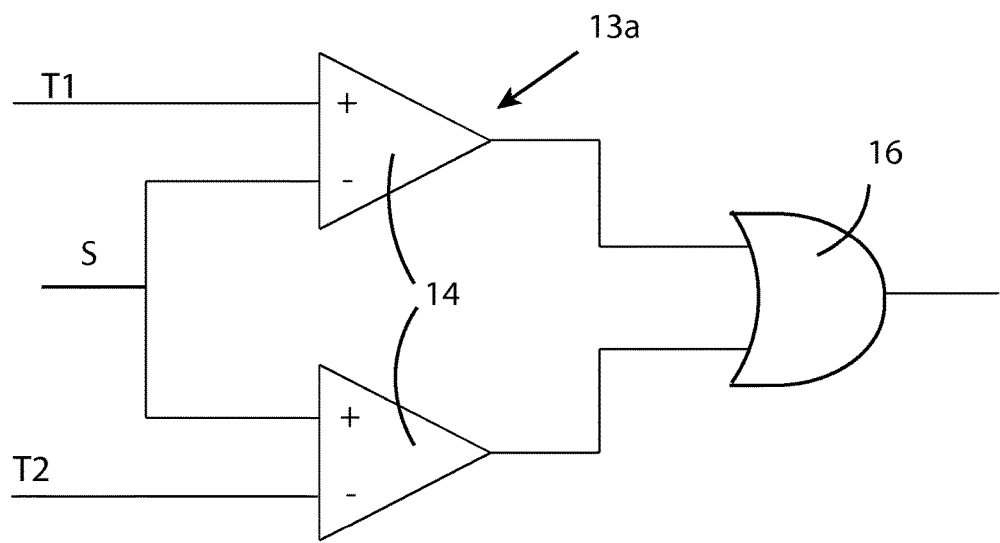
FIG. 2 shows an example of a detector unit for detecting water containing chemical agents inside the robot.

FIG. 2 shows an example of a simple detector unit 13a for detecting water containing chemical agents inside the robot when the sensor 10 is a photo-reflector. The detector unit 13a comprises two comparators 14 receiving the output signal S from the photo-reflector and an electric circuit 16 configured to detect if any of the output signals from the comparators is changing. The voltage of the output signal S is compared with a first threshold value T1 representing acid water and a second threshold value T2 representing basic water. The output signals from the comparators will change if the output signal S changes compared to the threshold values. For example, the output from the electric circuit 16 is 0 if not water is detected and 1 if water leaking into the robot is detected.

The gear unit 8 of the robot transmission system 5 is provided with a lubricant, e.g., in the form of lubricating oil, such as mineral oil, or any other suitable lubricant, such as lubricating grease. To avoid that the lubricant leaks out to the outside environment, the transmission system 5 comprises a seal (not shown) adapted to prevent the lubricant entering a space 18 between the gear unit 8 and the robot joint 3. It may occur that the lubricant leaks from the seal. If there is a leakage of lubricant from the transmission system 5, it is important to detect the leakage as soon as possible in order to avoid that lubricant leaks to the surrounding environment and contaminates the food.

Figure 3:
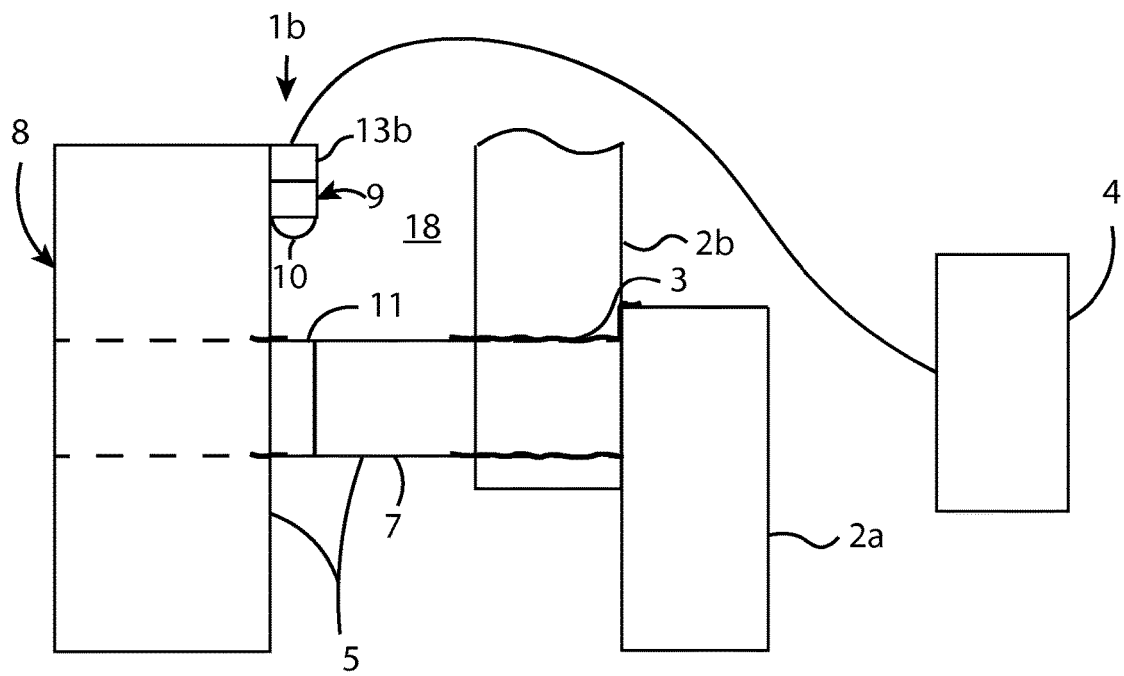
FIG. 3 shows a part of a robot according to a second embodiment of the invention.

FIG. 3 shows a part of an industrial robot including a leakage detection device 1b according to a second embodiment of the invention. In this embodiment, the leakage detection device 1b is configured to detect leakage of lubricant as well as of water containing chemical agents. The leakage detection device 1b comprises at least one pH-strip 11. Lubricant leaking from the gear unit 8 will follow the shaft 7 and end up in the space 18 between the gear unit 8 and the second arm 2b. Water leaking from the joint 3 will also follow the shaft 7, but in an opposite direction, and end up in the space 18, as illustrated in FIG. 3.

In this embodiment, the pH-strip 11 is a pH paper, which changes to a different color depending on the pH of the liquid in contact with the pH paper. The pH-strip 11 is arranged closer to the gear unit 8 than to the robot joint 3. Preferably, the pH-strip 11 is arranged in close vicinity to a seal of the gear unit 8. By arranging the pH-strip 11 close to the seal of the gear unit, a fast detection of leaking lubricant is achieved and it is possible to quickly take measures to prevent the lubricant from leaking out from the robot. When there is a leakage from the inside of the transmission system, the leaked lubricants (oil/grease) will dip the pH-strip 11, and make the surface color turn darker. When there is water coming in from the robot joint, the pH-strip 11, for example, will turn red when it is acid and turn blue when it is basic. In this embodiment only one pH-strip 11 is used. However, it is also possible to have two pH-strips disposed adjacent to each other. The sensor module 9 is arranged above and facing the pH-strip 11 and may comprise one CCD camera, or a photo reflector.

The leakage detecting device 1b comprises a detector unit 13b configured to detect leakage of water containing chemical agents as well as leakage of lubricant based on the detected color change of the pH-strip 11. The detector unit 13b is also configured to distinguish whether the leakage is from the transmission system, or from the outside of the robot based on the detected color change of the pH-strip 11. The sensor module 9 sends information about color changes of the pH-strip to the detector unit 13b.

The output from the sensor module 9 is, for example, a voltage signal having a value that depends on the color of the pH-strip, or images of the pH-strip, and the detector unit 13b is configured to determine whether the color change is a result of lubricant or water wetting the pH-strip. To distinguish whether the leakage includes lubricant from the transmission system or water from the robot joint, the output voltage of the sensor is compared with different pre-set voltages (threshold values). The coupled effect (when both oil and water affect the pH-strip) shall be considered before setting the threshold values. This can be guaranteed by selecting a proper pH-strip. The pre-set voltage is, for example, adjustable with a potential meter, ranging from the status of non-leakage to leakage, which implies the leakage criteria. Accordingly, a comparator can be used to compare the output signal from the sensor and the signal from the potential meter and to produce a final signal.

If the sensor module 9 comprises a CCD camera, images of the pH-strip are sent to the detector unit 13b. The detector unit comprises an image analyzing module configured to detect the color change of the pH-strip, and to distinguish the root cause of the color change.

Figure 4:
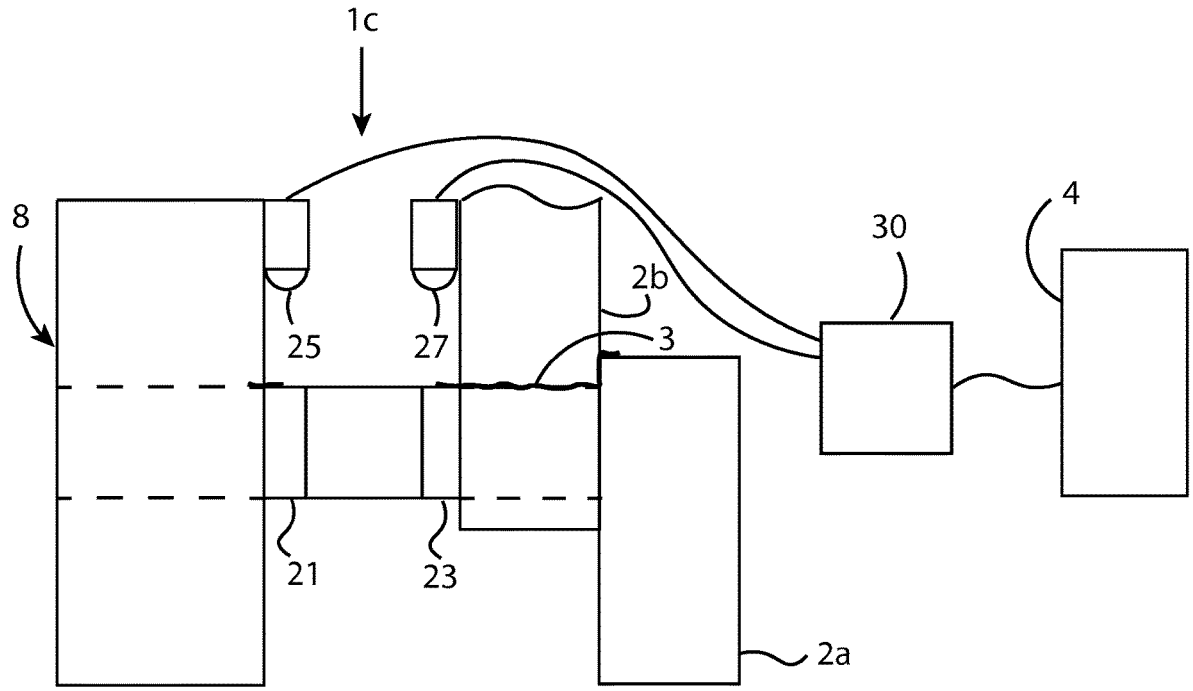
FIG. 4 shows a part of a robot according to a third embodiment of the invention.

FIG. 4 shows a part of an industrial robot including a leakage detection device 1c according to a third embodiment of the invention. In this embodiment the leakage detection device comprises two indicator strips 21, 23 arranged between the second arm 2b and the gear unit 8. In this embodiment, each indicator strip 21, 23 can be any type of paper, which becomes darker when it is in contact with a liquid, or a pH paper, which changes to a different color depending on the pH of the liquid in contact with the pH paper. A first indicator strip 21 is arranged closer to the gear unit 8, and a second indicator strip 23 is arranged closer to the second arm 2b, and accordingly closer to the robot joint 3. The first indicator strip 21 will serve to detect oil leakage from the gearbox, and second indicator strip 23 will serve to detect water leakage from the external environment. The sensor module comprises a first sensor 25 arranged above and facing the first indicator strip 21, and a second sensor 27 arranged above and facing the second indicator strip 23. The leakage detection device 1c further comprises a detector unit 30 connected to the first and second sensors 25, 27. The detector unit 30 receives information about the color changes of the first indicator strip 21 and information about the color changes of the second indicator strip 23, and determines when there is a leakage of lubricant and/or water based on the received information.

If one of the indicator strips 21, 23 changes its color, the sensor facing that indicator strip detects the changes in color and sends the information about the color change to the one of the detector unit. The detector unit may send the information about the leakage to the robot controller 4. Depending whether the first or the second indicator strip 21, 23 changes its color different conclusion about whether the color change is due to the leaking of water or due to the leaking of lubricant can be made by the robot controller 4. If the robot controller receives information about a color change of the first indicator strip 21 before receiving information about a color change of the second indicator strip 23, the robot controller comes to the conclusion that the color change is due to leaking lubricant since the oil leaking from the transmission system 5 will first come into contact with the first indicator strip 21 before reaching the second indicator strip 23. If the robot controller receives information about a color change of the second indicator strip 23 before receiving information about a color change of the first indicator strip 21, the robot controller comes to the conclusion that the color change is due to leaking water, since the water leaks through the robot joint and will therefore first come into contact with the second indicator strip 23 before reaching the first indicator strip 21.

Figure 5:
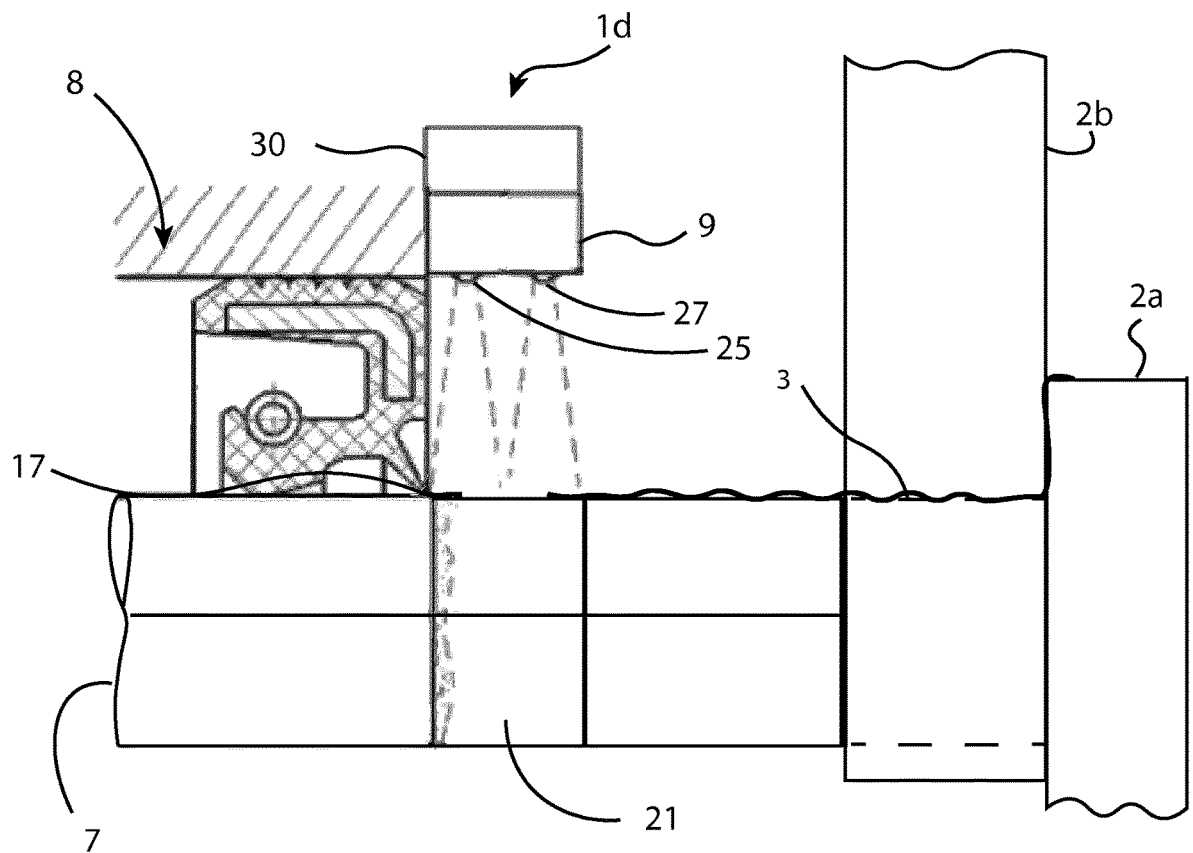
FIG. 5 shows a part of a robot according to a fourth embodiment of the invention.

FIG. 5 shows a part of an industrial robot including a leakage detection device 1d according to a fourth embodiment of the invention. This embodiment detects leakage of lubricant as well as water. The leakage detection device 1d comprises at least one indicator strip 21, such as indicator paper or pH-strip, arranged inside the robot and configured to change color in contact with a liquid, a sensor module 9 configured to detect changes in color of the indicator strip, and a detector unit 30 configured to determine presence of liquid inside the robot based on the detected color changes of the indicator strip. The leakage detection device in capable of distinguishing between lubricant and water based on the detected color changes of the at least one indicator strip. The indicator strip 21 can be any type of paper, which becomes darker when it is in contact with a liquid. It is also possible to use a pH paper, which changes to a different color depending on the pH of the liquid in contact with the pH paper, instead of the indicator paper. The sensor module 9 and the indicator strip 21 is arranged close to the gear unit 8. The gear unit 8 comprises a seal 17, for example a lip seal, adapted to prevent leakage of lubricant from the gear unit, and the indicator strip 21 is disposed on the shaft 7 and in an area close to the seal 17.

In order to distinguish the lubricant and water, two sensors 25, 27 are installed above the shaft 7. The indicator strip 21 is wrapped around the shaft 7 up to an area that both sensors could cover. The sensor module 9 comprises a first sensor 25 and a second sensor 27 arranged adjacent to each other. The first sensor 25 is disposed closer to the gear unit 8 than the second sensor. The first and second sensors 25, 27 are arranged to detect different parts of the indicator strip 21. The first sensor 25 is configured to detect color changes of a first part of the indicator strip 21 close to the gear unit 8, and the second sensor 27 is configured to detect color changes of a second part of the indicator strip 21 spaced apart from the gear unit.

The sensors 25, 27 are preferably IR-based sensors, so called photo reflectors, which provide different voltage output based on different reflecting ratios of the surface of the indicator strip 21, and accordingly based on the color of the strip. The first and the second sensors 25, 27 are arranged above and face the indicator strip 21. In this example only one indicator strip 21 is used. However, it is also possible to have two strips disposed adjacent to each other.

The lubricant is more viscous than water and, accordingly, moves slower than water. Because of the high viscosity of the lubricant, the first part of the strip disposed closest to the gear unit will change color before the second part of the strip disposed further away from the gear unit, when there is a leakage of lubricant from the gear unit. If it's a leakage of water through the robot joint 3, the whole or a larger part of the strip will change its color due to the low viscosity of water. A detector unit 30 is configured to receive the output signals from the first and second sensors 25, 27 and to determine whether lubricant or water is leaking into the space 18 based on the output signals from the first and second sensors.

When the lubricant leaks from the seal onto the rotatable shaft 7, the lubricant will first come in contact with the part of the indicator strip 21 closest to the gear unit 8. The first sensor 25 will detect the color change and send the signal containing the information about the color change to the detector unit 30. If the second sensor 27 has not detected any color change of the second part of the indicator strip 21, closest to the second arm 2*b*, the detector unit determines that the cause of the color change is leaking lubricant. When water leaks inside the robot from the robot joints 3 onto the rotatable shaft 7, the water will come in contact with the first and second part of the indicator strip 21. The first sensor 25, as well as the second sensor 27, will detect the color change and send signals containing the information about the color change to the detector unit 30. If both sensors 25, 27 have detected a color change, the detector unit 30 determines that the cause of the color change is leaking water.

In this embodiment, there is no need of any comparator. Instead, the detector unit 30 may comprise embedded intelligence, for example a microchip including a microcontroller, memory and analog semiconductors. Both sensors 25, 27 can be directly connected to I/O ports with an ADC function (Analog to Digital Conversion) of the microchip. The output voltage of the sensors, which indicates the color, can be read by these I/O ports. Via programming of the microchip, the voltage from these sensors 25, 27 will be obtained and compared to a pre-set value, or between themselves, which gives different conclusions based on different situations.

The color-voltage relationship has to be calibrated beforehand. In the example described below, a pH-strip is used. In a first step, the color-voltage relationship is determined for the default color of the pH-strip. By scanning a clean pH-strip at the real working environment, or at similar lighting condition, with the photo reflector sensor, the corresponding voltage can be read and logged, which serves as a default voltage. In order to increase the robustness of comparison, an interval of voltage value is centered around the pre-set value via programming.

In order to calibrate the color-voltage relationship when only water including a certain chemical agent, such as cleaning detergent, is leaking into the robot, the pH-strip is dipped with a mixture of water and the chemical agent. Depending on which chemical agent is mixed in the water, acid or basic will change the color of pH-strip into different spectrum. Since the cleaning detergent is always specified by the cleaning process, the color change of the pH-strip is mostly fixed for one type of wash down. Therefore, by scanning a dipped pH-strip with the photo reflector, a corresponding voltage can be read and logged. This voltage value is defined as one threshold value. In order to increase the robustness of the comparison, an interval of voltage values is centered around this threshold value via programming, named as pre-calibrated interval.

Case 1 Water Ingression Only

In this case, both sensors 25, 27 will detect a color change of the pH-strip. If the voltage values from both sensors fall into a pre-calibrated voltage interval corresponding to a certain water-detergent mixture, the conclusion is water ingression only.

Case 2 Lubricant Leakage Only

The first senor 25, closer to the seal, will always detect the lubricant leakage first. If the first sensor 25 detects a color change of the pH-strip, compared to the default color, but meanwhile the second sensor 27 detects no color change, the conclusion is lubricant leakage only.

Case 3 Lubricant Leakage & Water Ingression Happens at Almost the Same Time

Very low chance for this case, but it could happen. If both sensors 25, 27 detect a color change of the pH-strip compared to the default color, but only the voltage value from the second sensor 27 falls into the pre-calibrated voltage interval, the conclusion is water ingression and lubricant leakage.

If an indicator paper is used instead of a pH-strip, the method can be modified as described below. The color-voltage relationship for color for a dry indicator paper is determined. Further, the color-voltage relationship when the indicator paper is wet is determined in the same way as described above. The color change of the indicator paper will be the same for water and lubricant. Thus, when an indicator paper that is not sensitive for the pH changes is used, it is not possible to distinguish between water including different cleaning detergents. By scanning a dipped indicator paper with the photo reflector, a corresponding voltage can be read and logged. This voltage value is defined as a threshold value. In order to increase the robustness of the comparison, an interval of voltage values can be centered around this threshold value.

Case 1 Water Ingression

In this case, both sensors 25, 27 will detect a color change of the indicator paper. If both voltage values are above the threshold voltage, the conclusion is water ingression.

Case 2 Lubricant Leakage

The first sensor 25, situated closer to the seal, will always detect the lubricant leakage first. If the first sensor 25 detects a color change of the indicator paper, compared to the default color, but meanwhile the second sensor 27 detects no color change, the conclusion is lubricant leakage only.

Instead of installing two photo reflector sensors, it is possible to arrange one CCD camera in the same position, i.e. straight above the pH-strip, which can also detect the oil leakage and the water ingression. The CCD camera takes pictures of the pH-strip with certain time intervals. The pictures can be analyzed directly by imagine processing software. Hence, information like how the color changes, in which area the color changes occur can easily be obtained from the pictures, and the leakage/ingression can be concluded based on this information in the same way as described above.

Figure 6:
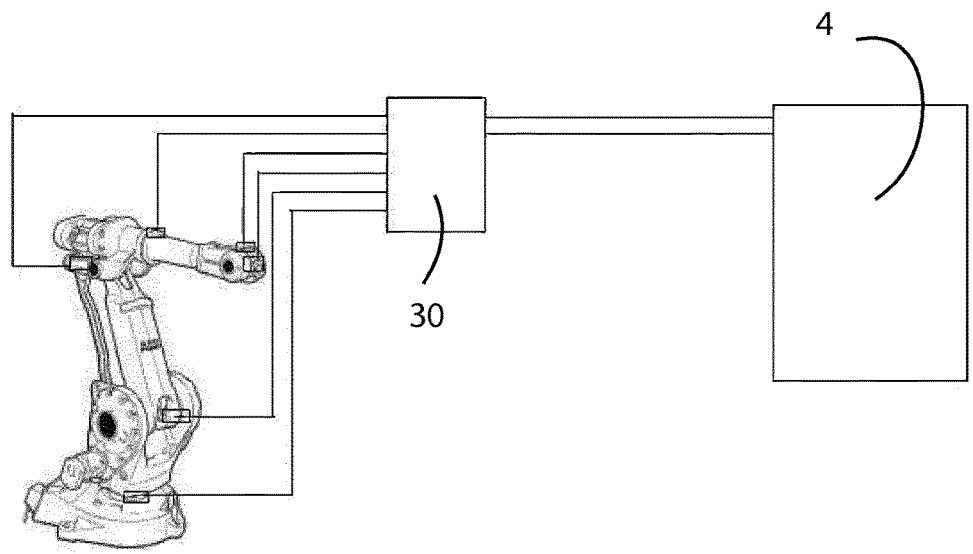
FIG. 6 shows an example of an industrial robot having a plurality of joints provided with leakage detection devices.

FIG. 6 shows an industrial robot according to one embodiment of the invention. The robot comprises of a plurality of leakage detection devices arranged at each of the robot joints. The leakage detection devices can detect both water (basic or acid) and lubricants. In this embodiment, the output signals from sensors are transferred to a common detector unit 30. The detector unit 30 may comprise a micro controller programmed to analyze the senor signals and to determine if there is leakage in any of the joins. The detector unit 30 is configured to transfer information about detected leakage to the robot controller 4 or to a response terminal. Regarding the signal transmission, either a conventional serial communication or a wireless communication could be implemented.

The invention claimed is:

1. An industrial robot for food industry wherein the robot has a plurality of joints, a transmission system for moving the joints, and a leakage detection device for detecting a liquid leaking into the robot, wherein the leakage detection device includes:
   at least one indicator strip arranged inside the robot and configured to change color in contact with a liquid,
   a sensor module configured to detect changes in color of the at least one indicator strip, and
   a detector unit configured to determine presence of liquid inside the robot based on the detected color changes of the at least one indicator strip,
   wherein the leakage detection device is capable of distinguishing between lubricant and water;
   wherein said at least one indicator strip is a pH-strip configured to change color in dependence on the pH value of a liquid in contact with the pH-strip.

2. The industrial robot according to claim 1, wherein the leakage detection device is configured to distinguish whether the detected water is basic or acid based on the detected color changes of the pH-strip.

3. The industrial robot according to claim 1, wherein the detector unit is configured to distinguish between lubricant and water based on the detected color changes of the at least one indicator strip.

4. The industrial robot according to claim 1, wherein the transmission system includes a rotatable shaft for moving one of the joints and said at least one indicator strip is arranged on the shaft.

5. The industrial robot according to claim 1, wherein said sensor module includes at least one sensor facing the at least one indicator strip.

6. The industrial robot according to claim 1, wherein said leakage detection device is configured to detect lubricant leaking from the transmission system and to distinguish whether the leakage is from the transmission system or from the outside of the robot based on the detected color change of said at least one indicator strip.

7. The industrial robot according to claim 1, wherein said sensor module is configured to detect changes in color of different parts of said at least one indicator strip, and said detector unit is configured to determine whether the leakage comes from the transmission system or from the outside of the robot based on detected changes in color in different parts of the at least one indicator strip.

8. The industrial robot according to claim 1, wherein said sensor module includes a first sensor and a second sensor configured to detect changes in color of different parts of said at least one indicator strip, and said detector unit is configured to determine whether the leakage comes from the transmission system or from the outside of the robot based on the output from the first and second sensors.

9. The industrial robot according to claim 8, wherein the transmission system includes a seal for preventing leakage of lubricant from the transmission system, said first sensor is arranged to detect changes in color of the at least one indicator strip in an area closer to the seal, and the second sensor is arranged to detect changes in color of the at least one indicator strip in an area further away from the seal.

10. The industrial robot according to claim 9, wherein said at least one indicator strip includes a first indicator strip and a second indicator strip arranged inside the robot, the first indicator strip is located closer to the seal and the second indicator strip is located closer to one of the joints, and said first sensor is arranged to detect changes in color of the first indicator strip and the second sensor is arranged to detect changes in color of the second indicator strip, and the detector unit is configured to distinguish between lubricant and water based on color changes of the respective indicator strips.

11. The industrial robot according to claim 1, wherein the transmission system includes a gear unit, and said at least one indicator strip is arranged in a space between the gear unit and one of the joints, and the indicator strip is located closer to the gear unit than to said one of the joints.

12. The industrial robot according to claim 1, wherein the sensor module is configured to generate a voltage signal based on the color of the indicator strip and the detector unit is configured to receive the voltage signal from the sensor module and to detect the color change of the indicator strip based on the received voltage signal.

13. The industrial robot according to claim 12, wherein the detector unit is configured to distinguish whether the leakage is from the transmission system or from the outside of the robot based on the level of the voltage signal, and on a plurality of threshold values for the voltage.

14. The industrial robot according to claim 1, wherein said sensor module includes at least one photo reflective sensor that provides different voltage output based on different reflecting ratio of the indicator strip.

* * * * *